United States Patent [19]

Marlin et al.

[11] 3,849,156

[45] Nov. 19, 1974

[54] PROCESS FOR PROVIDING A BACKING ON CARPETS

[75] Inventors: Lawrence Marlin, Yorktown Heights; Eric George Schwarz, Somers, both of N.Y.

[73] Assignee: Union Carbide Corporation, New York, N.Y.

[22] Filed: Aug. 11, 1972

[21] Appl. No.: 279,887

Related U.S. Application Data

[63] Continuation-in-part of Ser. Nos. 795,694, Jan. 31, 1969, abandoned, and Ser. No. 199,170, Nov. 16, 1971, abandoned, which is a continuation-in-part of Ser. No. 795,406, Jan. 31, 1969, abandoned, and Ser. No. 795,674, Jan. 31, 1969, abandoned.

[52] U.S. Cl............... 117/10, 117/11, 117/143 R, 117/138.8 B, 117/161 KP, 264/47, 264/297
[51] Int. Cl............................................. B44c 1/02
[58] Field of Search............ 117/11, 161 KP, 143 R, 117/DIG. 7, 138.8 B, 10; 260/2.5 AB, 2.5 AC, 2.5 AF, 2.5 BD, 77.5 AB, 75 TN

[56] References Cited
UNITED STATES PATENTS

| | | | |
|---|---|---|---|
| 2,629,919 | 3/1953 | Golden | 117/163 X |
| 2,637,095 | 5/1953 | Mersereau | 117/161 UD |
| 3,194,773 | 7/1965 | Hostettler | 260/2.5 |
| 3,291,660 | 4/1965 | Oberth et al. | 260/77.5 X |
| 3,432,474 | 3/1969 | Lombardi | 260/2.5 X |
| 3,474,075 | 10/1969 | Zemlin | 260/77.5 X |
| 3,523,103 | 8/1970 | Zemlin | 260/2.5 X |

FOREIGN PATENTS OR APPLICATIONS

| | | | |
|---|---|---|---|
| 803,771 | 10/1958 | Great Britain | 260/2.5 AF |
| 822,546 | 10/1959 | Great Britain | 260/2.5 AF |
| 707,380 | 4/1965 | Canada | 260/2.5 AF |
| 707,381 | 2/1965 | Canada | 260/2.5 AF |

*Primary Examiner*—William D. Martin
*Assistant Examiner*—Theodore G. Davis
*Attorney, Agent, or Firm*—Reynold J. Finnegan

[57] ABSTRACT

Process for providing a backing on a carpeting material comprising (1) forming a heat curable polyurethane forming froth which is substantially structurally and chemically stable but workable at ambient conditions, (2) applying said froth to the back of carpeting; (3) shaping said froth and (4) curing the resultant shaped froth at a temperature of at least 70°C. to form a cured polyurethane foam backing on said carpeting material.

24 Claims, 4 Drawing Figures

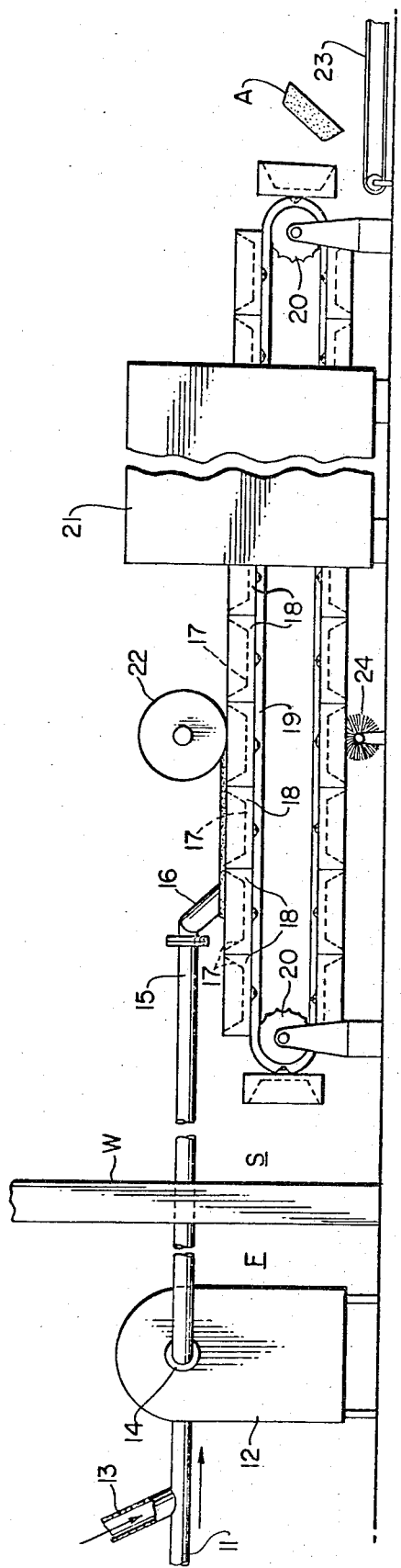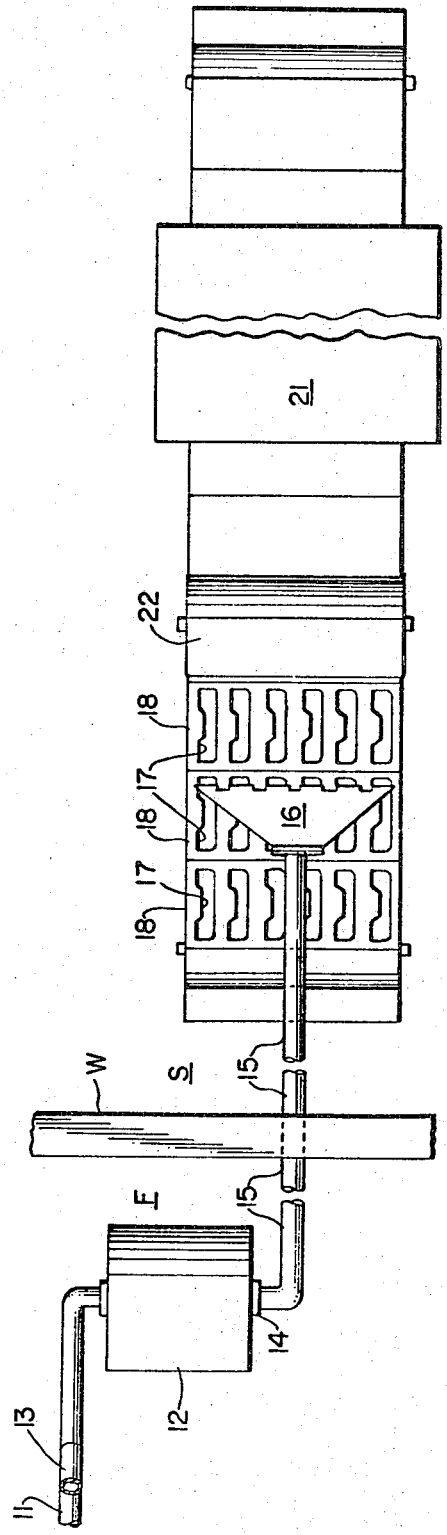

PROCESS FOR PROVIDING A BACKING ON CARPETS

This application is a continuation-in-part of U.S. applications, Ser. Nos. 795,674 filed Jan. 31, 1969, now abandoned, and 199,170 filed Nov. 16, 1971, now abandoned, which application is a continuation-in-part of U.S. applications, Ser. Nos. 795,406 and 795,674, both filed Jan. 31, 1969, and both abandoned.

BACKGROUND OF THE INVENTION

This invention relates to novel processes for making shaped, foamed, polyurethane products, e.g., the novel heat curable polyurethane-forming froths of this invention have extensive utility in the production of molded polyurethane foam articles, foam backings for carpeting and fabrics, coatings for wire, cable and other articles, small cavity encapsulations and the like. More particularly this invention relates to a process for providing polyurethane foam backings for carpeting.

Products made out of polyurethanes have many desirable properties, including resistance to heat, aging, fungus, water, oil, gasoline, chemicals, such as acidic materials, basic materials and dry cleaning solvents.

In these regards, polyurethanes are far superior to other rubber materials and most other plastic materials, and, thus, are highly desired for use in making foamed articles such as automotive crash padding, backing for carpets, interlinings for apparel, mattresses, pillows, cushioning materials, etc.

In recent years, various methods have been developed in the art for producing foamed polyurethane articles. The majority of these methods use low boiling or volatile agents or chemical agents which produce a gas, such as carbon dioxide, through chemical reaction while the polymerization of the polyurethane-forming components is proceeding.

In order to prevent premature collapse of the cells or pores of the foam produced by the volatile or chemical agent, a fast polymerization system, i.e., fast-acting polyurethane-forming ingredients and/or polymerization catalysts, were used so as to rapidly increase the viscosity of the foam.

Thus it has been the practice in the past manufacture of polyurethane foams to use relatively fact-acting components so that the gas bubbles generated to form the cells of the foam would be swiftly entrapped. In order to do this, the curing or polymerization must proceed at high speed with almost an instantaneous steep increase in viscosity. Since bubble formation or expansion as well as curing were taking place simultaneously, it was very difficult to control the size of an article formed by such methods as knife coating before it set and became unworkable. Hence molding methods are widely used commercially to control the size of articles produced from polyurethane foams.

As noted in U.S. Pat. Nos. 3,046,177 and 3,181,199, "Unexpected irregularities in performance make the long distance movement of polyurethane froth highly disadvantageous." Also, when the expanding mixture is applied to rough surfaces such as the back of a carpet, it would expand to substantially the same degree throughout and reproduce a rough or uneven surface on the resulting foam. Both of the abovementioned patents teach the immediate formation and shaping of the foam.

Thus it has been difficult and, in most cases, impossible to adequately shape foamed polyurethane-forming materials on the back of a carpet prior to polymerization or setting of the shape because of the rapidity with which such materials react chemically to form an unworkable mass. In addition, since the material is simultaneously foaming and polymerizing its size and shape are changing during the period that it is in workable form and, when its size and shape have stabilized, the material is no longer workable. For example, in order to apply the foam and polymerizing material to a carpet back, this can only be done well before the foaming and polymerizing has completely stopped. As a result, the material is still increasing in size and changing in shape after being doctored on to the carpet back and surface iregularities and roughness cannot be avoided without great difficulty.

The usual procedure has been to shape the polyurethane foam after it has been produced and such methods as cutting, slicing and the like have been employed in the shaping operation. When the thus shaped foam was to be applied to a substrate as in forming a carpet backing or fabric interlining, an adhesive had to be employed.

Other attempts have been made heretofore to produce foamed products from materials capable of forming polyurethane by the use of normally gaseous materials such as air. In such attempts, as well as in prior foaming processes using chemically reactive or volatile foaming agents, the time between the formation of the expanded material and curing said expanded material into an unworkable foam was so short as to prevent adequate shaping of the foamed material into the precisely desired shape and setting such shape.

Many difficult types of apparatus and techniques have been devised to overcome this basic defect of such systems. For example, U.S. Pat. No. 3,046,177, discloses special apparatus for violently mixing the reaction ingredients and catalyst, almost instantaneously discharging the resulting mixture which is reacting on a mold surface, and simultaneously distributing and shaping the mixture on the mold surface with air jets. The back of a carpet is then quickly pressed onto the mixture carried by the mold surface. This approach requires the use of specially constructed equipment and precise timing and mainly for these reasons has found very little acceptance.

Accordingly it is an object of the instant invention to provide novel processes for making shaped, foamed polyurethane products. It is also an object of this invention to provide a process for providing cured polyurethane foam backings for carpeting. It is a further object of this invention to provide carpeting material having cure polyurethane foam backings produced by said process. Other objects and advantages of this invention will become readily apparent from the following description and appended claims.

SUMMARY OF THE INVENTION

According to the present invention, a novel froth is provided which is substantially structurally and chemically stable but workable at ambient conditions, i.e., capable of being transported for considerable distances and then shaped and formed, and can still be rapidly cured to a tack-free condition when desired by the application of heat, as by raising the temperature of the froth to 70°C. or more. The novel froths contain, as the substantially non-aqueous liquid phase, stable polyurethane forming components, i.e., components that are substantially reactive with each other only at a temperature of at least 70°C. or higher a surfactant for structurally stabilizing the froth until it is cured by heating and, as the gas or bubble phase, an inert gas, such as air, uniformly dispersed throughout the liquid phase in the form of tiny bubbles or cells.

The novel froth can contain a catalyst and/or a cross-linking agent so long as its presence will not initiate substantial polymerization at ambient temperatures. Other additives for providing special effects, e.g., coloring agents, fillers, etc. can also be included so long as they do not initiate substantial polymerization at ambient temperatures.

The liquid phase is substantially chemically stable and does not undergo substantial polymerization when the viscosity of a test admixture containing only the non-frothed mixed polyurethane-forming components, surfactants, and any catalysts composing the liquid phase does not reach about 10,000 centipoises in 2,600 seconds when held at a temperature in the range of 24.5° to 25.5°C. The materials are present in the test admixture in the same relative amounts as in the mixture used to produce the froth. The liquid phase can be thus characterized by mixing only those ingredients for about one minute and placing 7.5 ml of it in a Brookfield LVT Viscometer equipped with a jacketed small sample chamber, holding it at a temperature of 24.5 to 25.5°C. and determining its viscosity over the above-specified period of time. The froth is rapidly heat curable when a one-quarter inch thick section of it cures to a tack-free condition within about 30 minutes at about 125°C.

Thus the present invention provides methods for producing polyurethane foams wherein the expansion or foaming operation is separated from the polymerization operation. The froth is first formed by mechanically beating air or other inert gas into a heat-polymerizable mixture of polyurethane-forming components containing a froth stabilizer which can include additional components, such as, catalyst, and/or other desired ingredients. Accordingly the mixture is substantially chemically stable at ambient temperature and the resulting froth also is substantially chemically stable as well as structurally stable but workable at ambient temperatures. The froth is then or at a later time, shaped as desired and, thereafter at the desired time, the shaped froth is polymerized by the application of heat to fix its shape.

Conventional mixing equipment, such as, Hobart mixers, Oakes mixers and other whipping and high shear equipment, can be used and no special equipment or apparatus need be purchased. Time is not narrowly critical and no special fast acting equipment or timing controls are necessary. Temperature, of course, is critical only when elevated; an important feature of this invention is that normal ambient or lower temperatures can be used in the frothing and shaping operations.

As distinguished from those prior art methods which rely, wholly or in part, on chemical expansion during polymerization, the froth made and utilized by this invention is in an expanded condition before shaping or application to the substrate or mold; thus greatly improved dimensional control is available. Moreover, unlike chemical expansion, further thermal expansion of the air or other inert gas during the heat-polymerization cycle is uniform and controllable.

The present invention, because of its abovementioned beneficial features, is well suited for applying polyurethane foams to fabrics or carpet-backs, for molding a wide range of foamed articles, for coating wire and for encapsulating articles especially in small cavities as well as many other applications. The froths made and used in this invention have a uniform air content and can be spread across a wide expanse such as the primary backing of a carpet (e.g., a jute backing), knife coated to a uniform gauge and then polymerized by heat to produce a second integral foam backing on the carpet. Since the froth has a uniform air content, thermally induced expansion will be uniform and a smooth, uniformly high foam backing can be achieved. The froth can be made on a batch basis or continuously and can contain fillers, pigments, etc.

More particularly the instant invention may be described as a process for providing a backing on a carpeting material which comprises:

I. forming a substantially non-aqueous mixture comprising
   a. an organic polyisocyanate,
   b. an active hydrogen-containing compound substantially reactive with said polyisocyanate only at a temperature of at least 70°C. to form a polyurethane,
   c. an organosilicon surfactant for structurally stabilizing the froth produced according to step (II) below, during the period that the liquid phase of said froth is chemically stable and until said froth is cured by heating to a temperature of at least 70°C. to produce a cured foam, and
   d. a catalyst having substantial catalytic activity in the curing of said mixture only at temperatures of at least 70°C.;

II. substantially uniformly dispersing inert gas throughout the mixture by mechanical beating of said mixture to form a heat curable froth which is substantially structurally and chemically stable, but workable at ambient conditions, wherein
   i. components (a), (b), (c) and (d) above, present in the liquid phase of said froth are such that an unfrothed admixture containing only (a), (b), (c) and (d) in the same proportions (a), (b), (c) and (d) are present in the liquid phase of said froth is chemically stable to the extent that the admixture retains a viscosity of not greater than 10,000 cps for about 2,600 seconds at 25°C. ± 0.5°C.;
   ii. said froth has a density of not greater than 45 percent of the density of the unfrothed liquid phase; and
   iii. a ¼ inch section of said froth is curable to a tack free condition in not more than about 30 minutes at a temperature of 125°C.; and III. applying said froth to the back of carpeting;

IV. shaping said froth into a desired shape; steps (III) and (IV) being carried out without initiating any substantial polymerization; and V. curing the resultant shaped froth at a temperature of at least 70°C. to form a cured polyurethane foam backing on said carpeting material. Preferably said froth is free of auxiliary blowing agents and any further expansion of said froth during heat curing being substantially only thermal expansion of said inert gas employed.

As pointed out the mixture containing the polyurethane-forming components employed herein is substantially unreactive at ambient temperatures i.e., a non-frothed test admixture containing only the polyurethane-forming components, surfactants and, if needed, catalysts in the relative amounts these materials are present in the mixture used to make the froth, retains a viscosity of not more than 10,000 cps. (Brookfield 25°C.) when maintained at 25°C. ± 0.5°C. for about 2,600 seconds. Hence, during formation and shaping of the froth, no substantial polyurethane-forming reaction is initiated. On the other hand, the froths resulting from such mixtures are heat curable within a short period of time, i.e., a ¼ inch thick section of the froth of polyurethane-forming mixture employed herein is capable of polymerizing to a tack-free condition in not more than about 30 minutes at temperatures of about 125°C.

The mechanical beating operation involves the beating or whipping of the polyurethane-forming mixture in high shear equipment, such as, a Hobart mixer, or Oakes mixer and similar known equipment. The air or other inert gas can be pumped into the mixture under pressure during the beating or whipping operation or can be simply drawn and dispersed into the mixture from overlying air or gas layers by means of the beating or whipping action. The mechanical beating operation preferably is conducted at pressures not greater than 100 to 200 psig. Any inert normally gaseous material can be employed. Air, being the most plentiful and readily available inert gas, is, of course, preferred. However, nitrogen, carbon dioxide, etc., can be used instead, if desired.

BRIEF DESCRIPTION OF THE DRAWINGS

In the drawings:

FIG. 1 is a schematic side elevation 21 view, partially cut away, of a system illustrating the process of this invention as applied to the continuous manufacture of shaped, foamed polyurethane articles;

FIG. 2 is a fragmentary schematic plan view of the system shown in FIG. 1;

DESCRIPTION OF SPECIFIC EMBODIMENTS

Figure 3:
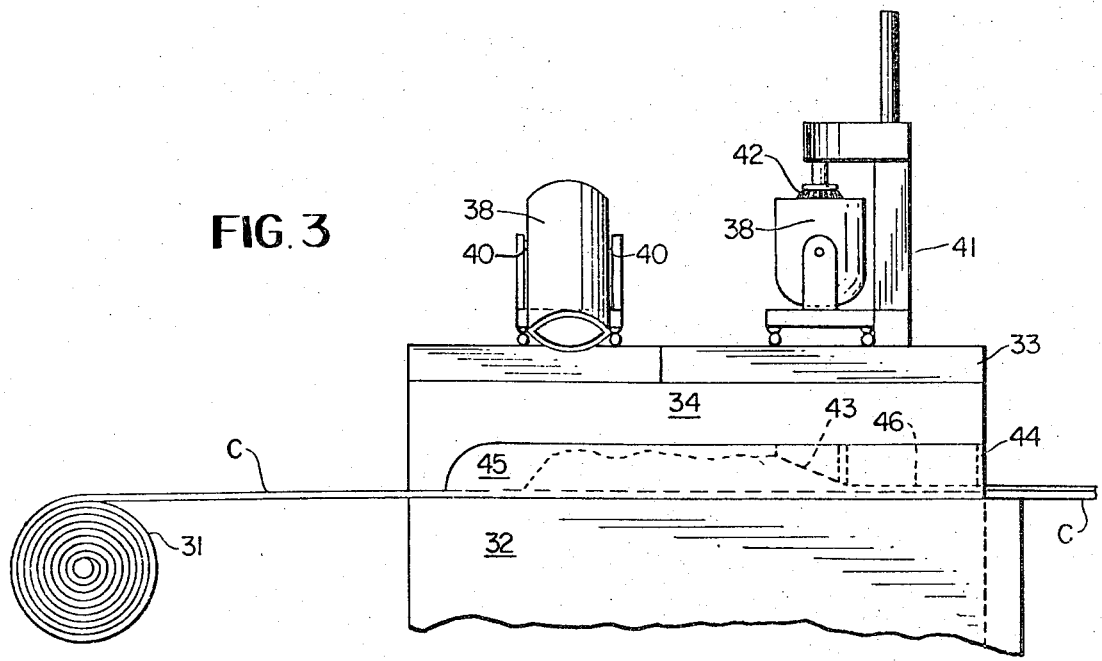
FIG. 3 is a schematic side elevational view, partially cut away, of a system illustrating the process of this invention as applied to the batch-type production of a polymerizable froth and its application to the back of a carpet.

Referring to FIGS. 1 and 2, a liquid mixture of polyurethane-forming components is pumped through pipe 11 into a continuous mechanical beater 12, such as an Oakes Mixer manufactured by the E. T. Oakes Corporation, located in a mixing and frothing room F.

Air or other inert gas is pumped through pipe 13 into the liquid mixture and both enter the beater 12 wherein they are mechanically beaten to form a froth. The relative amounts of air and liquid mixture are suitably adjusted to produce a froth which, at approximately atmospheric pressure has a density of not more than 45 percent, preferably 35 percent, of the density of the unfrothed liquid mixture flowing through pipe 11.

The froth formed in the mechanical beater 12 is forced out through outlet 14 through pipe 15 which passes through wall W to a distributor heat 16 located in a shaping and setting room S where it is diverted into six streams.

Each stream of froth is positioned over the mold cavities 17 of a plurality of molds 18 attached to and carried by an endless belt 19. In the embodiment shown, the mold cavities are of suitable shape for producing crash padded arm rests for automobiles. Sprocket wheels 20 support and drive the belt 19 which passes through a tunnel oven 21. Any suitable means may be employed to drive the sprockets 20.

A roller 22 is positioned over the molds 18 between the distributor 16 and the oven 21 and is in substantially non-pressure contact with the top surfaces of the molds 18. The distributor 16 is positioned a slight distance above the top surfaces of the molds 18 so that a small thickness of froth extends above such surfaces. The roller 22 contacts and presses downwardly the small thickness of froth to ensure that the froth uniformly contacts all inner surfaces of the mold cavities 17.

The oven 21 is maintained at an elevated temperature of 70°C or higher, for example, 70°C to 150°C, and is of a suitable length as correlated to the speed of the belt 19 to initiate and promote the polymerization of the froth to the extent that, when it leaves the oven, it will be tack-free and will retain the shape imparted to it by the molds 18. The speed of the belt 19 and the length of the oven 21 are correlated to the extent of providing the molds 18 with a dwell time in the oven of 3 to 20 minutes at the curing temperature. Dielectric heating can be used to cure thick sections of the froth.

After the molds 18 exit from the oven 21, they are inverted by the return of belt 19 and during inversion the polymerized, molded, foamed polyurethane arm-rest A falls out of the cavity 17 and onto conveyor 23 which carries it away to another station such as a packaging station. The bottom of cavities 17 can be equipped with suitable ejection means which can be activated by sprocket 20 to assist in ejecting the arm-rest A.

On the return travel the molds 18 pass over a brush 24 which can be driven for purposes of cleaning any residual debris from cavities 17. Also, if needed, a mold release composition can be sprayed into the cavities 17 as the molds 18 are returned for refilling.

The mixing and frothing room F is shown in FIGS. 1 and 2 for convenience to be adjacent to the shaping and setting room S. The room F can be located above or below, or even in a different building from, room S. The substantial structural and chemical stability of the froth permits the manufacturer a wide range of plant design options and would even permit piping or transporting the froth between separate plants.

Figure 4:
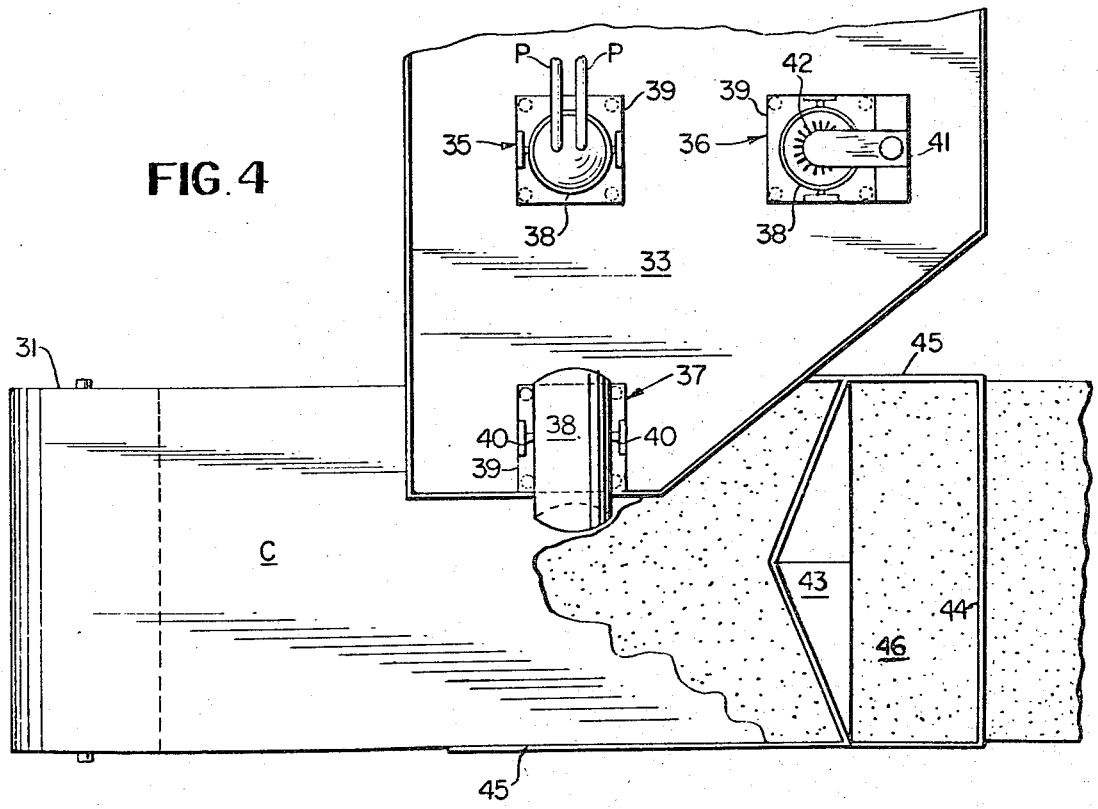
FIG. 4 is a fragmentary schematic plan view of the system shown in FIG. 3.

Referring to FIGS. 3 and 4 which schematically illustrate a system for using the present invention in a batch-type operation for applying a foamed polyurethane backing to carpeting, reference number 31 designates a roll of carpeting C which is caused to travel with its backside up over support table 32.

Froth preparation platform 33 is supported by supports 34 so as to jut out over the carpeting C. Platform 33 is provided with three stations, namely, filling station 35, frothing or beating station 36 and delivery station 37.

At filling station 35, the polyurethane-forming ingredients and other additives, such as catalysts, froth stabilizer etc. from pipes PP, are placed into a mixing bown 38 which is supported on dolly 39 by pivot pins 40 to permit tilting and emptying the bowl 38. The bowl 38 is only filled to less than half of its capacity in order to leave adequate room for froth formation.

The less-than-half filled bowl 38 and dolly 39 are then rolled to frothing station 36 where it is placed under a beater 41 such as Hobart mixer. An agitator unit 42 such as a Hobart wire whip is disposed in bowl 38 and is attached to the beater 41. The contents of bowl 38 are then beaten at high speed, for example, speed setting 2 on the Hobart mixer, for a period adequate to provide the desired froth density, e.g., not greater than 45 percent of the density of the liquid contents of the bowl. The beating time generally varies from 5 minutes to 30 minutes depending upon the speed of the beater 41 and the quantity of material in the bowl 38.

When froth of the desired density has been obtained, the bowl 38 and dolly 39 are moved to the delivery station 37 where the bowl is tilted and emptied onto the back of carpet C.

Spreader 43 mounted above carpet C spreads the froth across the entire width and knife 44 provides final adjustments to the thickness of the froth backing. Guides 45 are provided to guide the froth and line it up with the edges of carpet C.

Carpet C and the froth backing 46 applied to it are then passed through an oven (not shown) in similar manner to that shown in FIGS. 1 and 2, where the froth is heated and polymerized. The speed of travel of the carpet C and the length of the oven are so adjusted to provide a dwell time in the oven of three to twenty minutes and the temperature of the oven is advantageously maintained at 70°C. to 150°C. The time and temperature should be adequate to polymerize the froth to a tack-free, structurally stable condition.

It is advantageous to provide for some slight drainage of the liquid, polymerizable, polyurethane-forming mixture from the froth after it has been applied to the carpet back. Such drainage and subsequent heating in the oven not only locks together the fibers of the carpet back but also locks the carpet to the resulting foam backing. Drainage can be adjusted by reducing the amount of stabilizer used, by selecting an appropriate available stabilizer which will provide some drainage and/or by increasing the time elapsed between knifing the froth onto the carpet back and heating to polymerize in the oven.

Thus as pointed out, in accordance with our invention, we initially prepare a mixture of polyurethane-forming components, such as a polyisocyanate and any of the very well known compounds that react with the polyisocyanate to form a polyurethane, for example, a polyol or polyether polyol. The mixture also preferably contains a froth stabilizer, such as a silicone surfactant, and a catalyst, such as a heat activated, delayed action catalyst.

The polyisocyanate components employed in this invention for mixing with active hydrogen compounds to form the liquid phase of our novel froths preferably are those having the general formula:

$$Q(NCO)_i$$

wherein i is an integer of two or more and Q is an organic radical having the valence of i. Q can be a substituted or unsubstituted hydrocarbon group (e.g., an alkylene or an arylene group). Q can be a group having the formula $$Q'-Z-Q'$$

where $Q'$ is an alkylene or arylene group and Z is —O—, —O—Q'—, —CO—, —S—, —S—Q'—S—, or —SO$_2$—. Examples of such compounds include hexamethylene diisocyanate, 1,8-diisocyanato-p-menthane, xylylene diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, and isopropylbenzene-alpha-4-diisocyanate.

Q can also represent a polyurethane radical having a valence of i in which case Q(NCO)$_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of from about 30 per cent to about 200 per cent stoichiometric excess, the stoichiometry being based upon equivalents of isocyanate group per equivalent of hydroxyl in the polyol.

Further included among the isocyanates useful in this invention are dimers and trimers of isocyanates and diisocyanates and polymeric diisocyanates such as those having the general formula:

$$[Q''(NCO)_i]_j$$

in which i and j are each integers of two or more, and $Q''$ is a polyfunctional organic radical, and/or, as additional components in the mixtures, compounds of the general formula:

$$L(NCO)_i$$

in which i is one or more and L is a monofunctional or polyfunctional atom or radical. Examples of this type include ethyphosphonic diisocyanate, C$_2$H$_5$P(O)(NCO)$_2$; phenylphosphonic diisocyanate, C$_6$H$_5$P(O)(NCO)$_2$; compounds containing a ≡Si-NCO group, isocyanates derived from sulfonamides (QSO$_2$NCO), cyanic acid, and thiocyanic acid.

More specifically, the polyisocyanate component employed in the polyurethane-forming froths of this invention also include the following specific compounds as well as mixtures of two or more of them; 2,4-tolylene diisocyanate, 2,6-tolylene diisocyanate, crude tolylene diisocyanate, bis (4-isocyanatophenyl)methane, polyphenylmethylene polyisocyanates that are produced by phosgenation of anilineformaldehyde condensation products, dianisidine diisocyanate, toluidine diisocyanate, xylylene diisocyanate, bis(2-isocyanatoethyl) fumarate, bis(2-isocyanatoethyl) carbonate, 1,6-hexamethylenediisocyanate, 1,4-tetramethylenediisocyanate, 1,10-decamethylenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, bis 5,6-(2-isocyanatoethyl)

bicyclo[2,2,1]hept 2-ene, benzidinediisocyanate, 4,6-dimethyl-1,3-phenylenediisocyanate, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4'-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluenetriisocyanate, and many other organic polyisocyanates that are known in the art, such as those that are disclosed in an article by Siefken, Ann., 562, 75 (1949). In general, the aromatic polyisocyanates are preferred because of their greater reactivity.

It is also of considerable advantage to block the isocyanate groups of the polyisocyanates listed above with a monofunctional organic compound such as a phenol as described in Annalen, Volume 262, pages 205 to 229; Reinhold Plastics Applications Series on Polyurethanes by Bernard A. Dombrow, published by Reinhold Publishing Corporation, New York; 1957; and Polyurethanes: Chemistry And Technology I. Chemistry by Saunders & Frisch, pages 118 to 121, published by Interscience in 1963. Blocking techniques permit the use of the more highly reactive polyisocyanates and/or to adjust the polymerizing or curing temperature of the froth. One or any number of the isocyanate groups in the polyisocyanate molecule can be blocked to provide the degree of reactivity desired. In addition, catalysts such as those described in Bunge U.S. Pat. No. 2,886,555 can be employed to adjust the splitting or unblocking temperature to that desired.

The amount of polyisocyanate employed will vary slightly depending upon the nature of the polyurethane being prepared. In general, the total -NCO equivalent to total active hydrogen equivalent should be such as to provide a ratio of 0.8 to 2.0 equivalents of -NCO per equivalent of active hydrogen, e.g., hydroxyl hydrogen, of the active hydrogen reactant, and preferably a ratio of about 1.0 to 1.5 equivalents of -NCO per active hydrogen.

The active hydrogen-containing component includes polyhydroxyl-containing compounds, such as, the hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,787,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, and 2,621,166); hydroxymethyl-terminated perfluromethylenes (U.S. Pat. Nos. 2,911,390 and 2,902,473); polyalkyleneether glycols (U.S. Pat. No. 2,808,391; British Pat. No. 733,624); polyalkylenearyleneether glycols (U.S. Pat. No. 2,808,391); polyalkyleneether triols (U.S. Pat. No. 2,866,774).

Especially preferred polyhydroxyl-containing materials are the polyether polyols obtained by the chemical addition of alkylene oxides, such as, ethylene oxide, propylene oxide and mixtures thereof, to water or polyhydric organic compounds, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene gylcol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[(2-hydroxyethoxy)methyl]-ethane, 1,1,1-tris [(2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, caprolactone and the like. The alkylene oxides employed in producing polyoxyalkylene polyols normally have from 2 to 4 carbon atoms. Propylene oxide and mixtures of propylene oxide with ethylene oxide are preferred. The polyols listed above can be used per se as the active hydrogen compound.

A preferred class of polyether polyols employed in this invention can be represented generally by the following formula:

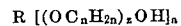

wherein R is hydrogen or a polyvalent hydrocarbon radical; a is an inetger (e.g., 1 or 2 to 6 to 8) equal to the valence of R, n in each occurrence is an integer from 2 to 4 inclusive (preferably 3) and z in each occurrence is an integer having a value of from 2 to about 200, preferably from 15 to about 100.

Additional active hydrogen-containing materials are the polymers of cyclic esters having a reduced viscosity value of at least about 0.15, and desirably from about 0.2 to about 15, and higher. The preferred polymers of cyclic esters have a reduced viscosity value of from about 0.3 to about 10. These polymers are homopolymers or copolymers characterized as containing units of the formula:

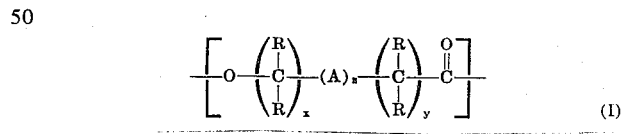

wherein each R, individually, is hydrogen, alkyl, halo, or alkoxy; wherein A is the oxy group, wherein x is an integer from 1 to 4; wherein y is an integer from 1 to 4; wherein z is an integer or zero or one; the sum of $x + y + z$ is at least 4 and not greater than 6; and the total number of R groups which are substituents other than hydrogen does not exceed 3, preferably does not exceed 2. Illustrative R groups include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed eight.

In one embodiment, preferred polymers of cyclic esters contain both recurring structural Unit I and units of the formula:

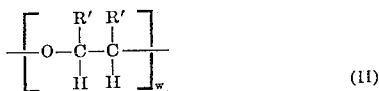

wherein each R', individually, is hydrogen, alkyl, cycloalkyl, aryl, or chloroalkyl, or in which the two R' variables together with the ethylene moiety of the oxyethylene chain of Unit II form a saturated cycloaliphatic hydrocarbon ring having from 4 to 8 carbon atoms, desirably from 5 to 6 carbon atoms and w is an integer of 1 or more, preferably 1 to 10. It is preferred that recurring Unit II contain from 2 to 12 carbon atoms. Illustrative R' variables include methyl, ethyl, n-propyl, isopropyl, t-butyl, the hexyls, the dodecyls, 2-chloroethyl, phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The aforedescribed recurring Unit (I) is interconnected through the oxy group (—O—) of one unit with the carbonyl group

of a second unit, i.e., the interconnection does not involve the direct bonding of two carbonyl groups,

On the other hand, the relatively low molecular weight cyclic ester polymers, e.g., those having reduced viscosity values below about 0.3 are characterized by end groups which can be hydroxyl or carboxyl. Cyclic ester polymers having an average molecular weight of about 500 to about 2,000 are preferred for use herein.

The preparation of the cyclic ester polymers is well documented in the patent literature as exemplified by U.S. Pat. Nos. 3,021,309 through 3,021,317; 3,169,945; and 2,962,524. Briefly, the process involves the polymerization of a mixture containing at least one cyclic ester monomer with or without a functional initiator therefor such as the polyols described hereinbefore and in the patents mentioned above, and a suitable catalysts, the choice of which will depend on the presence or absence of added initiator. Suitable cyclic ester monomers which can be employed in the manufacture of the cyclic ester polymers are best illustrated by the following formula:

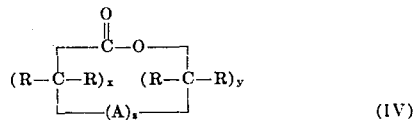

wherein the R, A, x, y, and z variables have the significance noted in Unit I supra. Representative cyclic ester monomers which are contemplated include, for example, delta-valerolactone; epsilon-caprolactone, zeta-enantholactone; the monoalkyldelta-valerolactones, e.g., the monomethyl-, monoethyl-, monohexyl-, delta-valerolactones, and the like. In the absence of added functional initiator, the polymerization process is desirably effected under the operative conditions and, as noted in U.S. Pat. No. 3,021,309 to U.S. Pat. No. 3,021,317, in the presence of anionic catalysts. When reacting a mixture containing cyclic ester monomer and functional initiator which possesses at least one active hydrogen substituent, e.g., carboxyl or hydroxyl, it is desirable to use the catalysts noted in U.S. Pat. Nos. 2,878,236, 2,890,208, 3,169,945 and 3,284,417 under the operative conditions discussed therein. Suitable polyol initiators and polycarboxylic acid initiators are those listed in U.S. Pat. No. 3,169,945 and others of the patents enumerated herein as well as those polyols and polycarboxylic compounds listed hereinbefore.

Polymers of cyclic esters can also be manufactured via the process described in U.S. Pat. No. 2,962,524.

Cyclic ester/alkylene oxide copolymers can also be prepared by reacting a mixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30°C. of from about 0.3 to about 1.0), in the presence of an inert normally-liquid saturated aliphatic hydrocarbon vehicle such as heptane and phosphorus pentafluoride as the catalyst therefor, at an elevated temperature, e.g., about 80°C., and for a period of time sufficient to produce such cyclic ester/alkylene oxide copolymers.

When the cyclic ester polymers are prepared from a mixture containing the cyclic ester monomer and minor amounts of a cyclic comonomer which is copolymerizable therewith, e.g., cyclic carbonates and cyclic ethers such as alkylene oxide, oxetane, tetrahydrofuran, etc., the polymeric chain of the resulting copolymeric product will be characterized by both recurring linear Unit I supra as well as the recurring linear Unit II (which would represent the alkylene oxide comonomer polymerized therein) and/or by a recurring linear unit which would correspond to the additional polymerizable cyclic comonomer in the monomeric mixture. When the comonomer is an alkylene oxide, the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—o—) of recurring linear Unit II is interconnected with the carbonyl group

of recurring linear Unit I supra or with the alkylene moiety of a second oxyalkylene Unit (II).

Polymers of cyclic esters as described above are useful in producing polyurethane articles having comparatively high strength and elongation.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, or other common organic solvents) at 30°C.

Another type of active hydrogen-containing materials useful in this invention are the polymer/polyol compositions obtained by polymerizing ethylenically unsaturated monomers in a polyol as described in British Pat. No. 1,063,222 and U.S. Pat. No. 3,383,351, the disclosures of which are incorporated herein by reference. Suitable monomers for producing such compositions include acrylonitrile, vinyl chloride, styrene, butadiene, vinylidene chloride and other ethylenically unsaturated monomers as identified and described in the above-mentioned British Patent and U.S. Patent. Suitable polyols include those listed and described hereinabove and in the British Patent and U.S. Patent. The polymer/polyol compositions can contain from about 1 to about 70 weight per cent, preferably about 5 to about 50 weight per cent, and most preferably about 10 to about 40 weight per cent monomer polymerized in the polyol. Such compositions are conveniently prepared by polymerizing the monomers in the selected polyol at a temperature of 40°C. to 150°C. in the presence of a free radical polymerization catalyst such as peroxides, persulfates, percarbonate, perborates and azo compounds. Further details of the compositions and methods of making same are described in the above-mentioned British Patent and U.S. Patent. The resulting composition is believed to be a complex mixture comprising free polyol, free polymer and graft polymer/polyol complexes. Preparation 1 of the British Patent is especially preferred. Polymer/polyol compositions of this type are useful in producing polyurethane articles having comparatively high load-bearing properties.

Mixtures of the above-active hydrogen-containing compounds can be employed as reactants with the polyisocyanate to form polyurethanes. For example, a mixture of a diol such as propylene glycol, polymer/polyol composition and cyclic ester polymer can be employed. Other illustrative mixtures include mixtures of polyether polyols; mixtures of polymer/polyol, dipropylene glycol and cyclic ester polymer; mixtures of polyether polyol, dipropylene glycol and polymer/polyol; mixtures of polyether polyol and dipropylene glycol and the like.

The polyol or polyol mixture employed in this invention can have hydroxyl numbers which vary over a wide range. In general, the hydroxyl numbers of the polyols or mixtures thereof, including other cross-linking additives, if employed, can range from about 28 to about 1,000, and higher, preferably from about 100 to about 800.

The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives used in the invention. The hydroxyl number can also be defined by the equation:

$$OH = 56.1 \times 1{,}000 \times f/m.w.$$

wherein OH = hydroxyl number of the polyol.
  $f$ = average functionality, that is average number of hydroxyl groups per molecule of polyol.
  $m.w.$ = average molecular weight of the polyol.

The exact polyol or polyols employed depends upon the end-use of the polyurethane foam. The molecular weight and the hydroxyl number are selected properly to result in flexible, semi-flexible, or rigid foams. The polyol or polyols including cross-linking additives, if used, preferably possesses a hydroxyl number of from about 200 to about 1,000 when employed in rigid foam formulations, from about 50 to about 250 for semi-flexible foams, and from about 45 to about 70 or more when employed in flexible foam formulations. Such limits are not intended to be restrictive, but are merely illustrative of the large number of possible combinations of the polyols that can be employed.

A wide variety of organosilicon surfactants can be employed herein for purposes of stabilizing the froth. A preferred stabilizer is an organosilicon copolymer consisting essentially of $SiO_2$ (silicate) units and $(CH_3)_3SiO_{0.5}$ (trimethylsiloxy) units in a mol ratio of silicate to trimethylsiloxy units of about 0.8:1 to about 2.2:1, preferably about 1:1 to about 2.0:1. These copolymers, hereinafter called trimethylsiloxy-silicate copolymers, and procedures for making them are described in coponding application, Ser. No. 664,641, filed Aug. 31, 1967, now abandoned.

A striking advantage in using the trimethylsiloxysilicate copolymers described above is their ability to synergistically retard the catalytic activity at ambient temperatures of certain commonly used catalysts, such as dibutyltin dilaurate, while still permitting them to promote curing at elevated temperatures. This is especially important since it permits the use in this invention of catalysts which ordinarily would be too active to permit frothing without substantial curing at ambient temperatures.

Another preferred organosilicon surfactant stabilizer is the partially cross-linked siloxane-polyoxyalkylene block copolymer and mixtures thereof wherein the siloxane blocks and polyoxyalkylene blocks are linked by silicon to carbon, or by silicon to oxygen to carbon, linkages. The siloxane blocks are comprised of hydrocarbon-siloxane groups and have an average of at least two valences of silicon per block combined in said linkages. At least a portion of the polyoxyalkylene blocks are comprised of oxyalkylene groups and are polyvalent, i.e., have at least two valences of carbon and/or carbon-bonded oxygen per block combined in said linkages. Any remaining polyoxyalkylene blocks are comprised of oxyalkylene groups and are monovalent, i.e., have only one valence of carbon or carbon-bonded oxygen per block combined in said linkages.

Additionally, conventional organo polysiloxanepolyoxyalkylene block copolymers such as those described in U.S. Pat. Nos. 2,834,748, 2,846,458, 2,868,824, 2,917,480 and 3,057,901 can be employed but are of lesser preference than the above-mentioned trimethylsiloxy-silicate copolymers and the partially cross-linked copolymers. Partially cross-linked copolymers and the trimethylsiloxysilicate copolymers are more useful with the non-prepolymer polyisocyanates; such as the monomeric polyisocyanates, for example, toluene diisocyanate.

The amount of the organosilicon polymer employed as a foam stabilizer in this invention can vary over wide limits, e.g., from about 0.5 weight parts to 10 weight parts or greater, per hundred weight parts of the active hydrogen component. There is no commensurate advantage to using amounts of organosilicon copolymer foam stabilizer less than 0.5 or greater than about 10 weight parts on the same basis. Preferably, the amount of organosilicon copolymer present in the foam formulations varies from about 1.0 weight parts to about 6.0 weight parts on the same basis.

Preferred catalysts include nickel acetylacetonate, more formally known as bis(2,4-pentanedionate) nickel (II), (diacetylacetonate nickel) and derivatives thereof such as diacetonitrilediacetylacetonato nickel, diphenylnitrilediacetylacetonato nickel, bis (triphenylphosphine)-diacetylacetonato nickel and the like. In addition, tin catalysts such as dibutyltin dilaurate can be used advantageously in the presence of the trimethylsiloxy-silicate copolymer surfactants described above. The amount of such catalyst employed in the liquid phase is preferably in the range of 0.03 to 3.0 weight parts per hundred weight parts of the active hydrogen compound.

Some conventional metal catalysts in conventional concentrations can be used when the trimethylsiloxysilicate copolymers are used as stabilizers. When other stabilizers are used, the conventional metal catalysts are used in low concentrations. Such catalysts include both inorganic metal compounds and metal compounds which contain organic groups. Particularly useful catalysts are organo-tin compounds. These catalysts can be used each alone or in mixtures with one or more of the others. Among the organo-tin compounds are stannous acylates such as dialkyl tin salts of carboxylic acids, e.g., dibutyltin dilaurate.

Other but less preferred latent catalysts which can be employed are the metal diorganodithiocarbamates wherein the organo groups can be, for instance, alkyl groups of up to 18 carbon atoms and preferably from 1 to 8 carbon atoms.

In certain systems, especially those having a high hydroxyl number, no catalyst at all is needed. As shown by the Examples set forth hereinafter, certain systems containing no catalysts at all are substantially structurally and chemically stable at ambient temperatures yet are curable by the application of heat at temperatures above about 70°C. The hydroxyl number of one such system preferably exceeds 400. Other non-catalyst systems include those where one of the reactants is catalytic, e.g., where the active hydrogen-containing compound is a strong base.

The liquid phase can contain other ingredients such as dyes, fillers, pigments, and other materials for providing desired effects. Small amounts of an auxiliary blowing agent can be employed. For example, high boiling fluorocarbons, e.g., boiling above about 40°C. can be used. Very small amounts of water, i.e., insufficient to bring about any substantial gas evolution, can be employed. Specific fluorocarbons include the Ucon fluorocarbons and Freons boiling above about 40°C., for example 1,1,2-trichloro-1,2,2-trifluoroethane and iosmers of tetrachlorodifluoroethane, tetrachloromonofluoroethane, and the like. The auxiliary agent, although it is not necessary, can be employed for purposes of providing an added expansion during heat curing in those cases where such added expansion is desired.

The gas phase of the novel froths is most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide and even fluorocarbons which are normally gaseous at ambient temperatures.

The inert gas is incorporated into the liquid phase by mechanical beating of the liquid phase in high shear equipment such as in Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than 100 to 200 psig. It is significant, however, to note that conventional, readily available, mixing equipment is used and no special equipment is necessary.

The amount of inert gas beaten into the liquid phase should be adequate to provide a froth having a density at ambient atmospheric pressure of less than about 45 percent, preferably less than about 35 percent, of the density of the liquid phase prior to frothing. The mechanical beating is conducted over a period of a few seconds in an Oakes mixer, or of 3 to 30 minutes in a Hobart mixer, or however long it takes to obtain the desired froth density in the mixing equipment employed.

The forth as it emerges from the mechanical beating operation is substantially chemically stable and is structurally stable but easily workable at ambient temperatures, e.g., about 15°C. to about 30°C. The consistency of the froth closely resembles the consistency of aerosol-dispensed shaving cream and it has a density of less than about 45 percent, or preferably less than about 35 percent, of the density of the liquid phase prior to frothing.

The novel froths of this invention find extensive utility in the production of shaped, foamed articles ranging from flexible foamed articles to rigid foamed articles and all degrees of flexibility and rigidity in between. For example, the novel froths can be molded and subsequently heat cured to form crash padded panels, dashboards, sun-visors, arm-rests and the like for automotive vehicles, airplanes and boats, and can be applied to and cured on the backs of carpeting to provide foam cushion backings or to textile fabrics to provide interlinings for padding and/or thermal insulation purposes.

Because of their substantial chemical and structural stability, the novel froths can be readily shaped by molds or doctor blades. Inasmuch as there is no substantial chemical expansion (i.e., expansion due to gas produced in the liquid phase by a chemical reaction) or expansion due to volatilization of a liquid and substantially only thermal expansion taking place during heat curing, dimensional changes are readily predictable and easily controlled. For these reasons, it is also possible to avoid duplication of rough surfaces such as in coating the rough and uneven backsides of carpets. This was not possible through the use of chemically expanded foams.

As will be seen in the following Examples, the present invention now permits the selection of appropriate amounts and types of surfactants which provide an appropriate amount of drainage of the liquid phase for example, into the interstices of a carpet back. This drainage upon subsequent heat curing not only locks the foam backing to the carpet but also serves the dual purpose of locking the fibers of the carpet back together. More specifically, this invention also provides a process for providing a second backing on a carpeting material composed of a first backing having a front side faced with fibers which pass through the first backing and which extend beyond the back side to the first backing to mechanically anchor the fibers to the first backing, which process comprises applying to (a) the back side of the first backing and (b) the portion of the fibers extending beyond said back side a substantially uniformly thick layer of a froth of this invention, and curing the froth at a temperature above 70°C. to (a) form a cured polyurethane foam of substantially uniform thickness as an integral second backing on the back side of the first backing and (b) bond the fibers to the first backing. The first backing can be any conventional carpet backing material (e.g., jute or polypropylene) and the fibers can be mechancially anchored to the first backing by any conventional means (e.g., by sewing or needle punching). The fibers can be composed of any conventional carpeting material (e.g., cotton, rayon, wool, nylon, acrylonitrile polymers, vinyl halide polymers, etc.). The fibers can be in any suitable form (e.g., in the form of pile yarns threaded through the first backing and having cut or looped pile faces on the front side of the first backing). The froth can be applied to the first backing by any suitable procedure (e.g., knife coating). The second backing can have any desired thickness (e.g., from 1/16 to ½ inches).

The novel froth is readily transportable by conveyor, suitable vehicle or piping from the site of its manufacture to the site of its use in coating the backs of carpeting or fabric, or in forming shaped articles by molding, or in coating wire or other articles, or in encapsulation operations.

The following illustrative examples are presented. All parts and percentages are on a weight basis, Me stands for the methyl group, Bu stands for the butyl group, all temperatures are on the Centigrade scale, and all densities are in pounds per cubic foot unless otherwise specified.

EXAMPLE 1

This example illustrates the production of a uniform foam backing of low density, 8 pounds per cubic foot, and of uniform thickness, ¼ inch, throughout.

In preparing our preferred frothable mixtures, we first dissolved about 0.5 weight parts of nickel acetylacetonate, which is a delayed action, heat activated catalyst in this system, in about 100 weight parts of a glycerol-started polypropylene oxide triol having a molecular weight of about 1,000 and a hydroxyl number of about 168. To this mixture there was added about 26 weight parts of tolylene diisocyanate which is stated by its manufacturer to contain about 80 weight percent of the 2,4-isomer and 20 weight percent of the 2,6-isomer. Then, as a froth stabilizer to stabilize the froth against bubble coalescence for a suitable length of time without collapse or excessive drainage, we added 6 weight parts of a stabilizer solution containing silicone surfactant which contained silicate units, and trimethylsiloxy units. The silicate units are stated to have the formula $SiO_2$ and the trimethylsiloxy units are stated to have the formula $(CH_3)_3SiO_{0.5}$. The ratio of silicate units to trimethylsiloxy units in the molecules of the stabilizer is stated to be about 2.0.

The mixture of polyisocyanate, polyol, catalyst and stabilizer after stirring for sixty seconds to form a homogeneous mixture had a viscosity of 75 centipoises as measured with a Brookfield viscometer at about 25°C. A 7.5 ml sample of the non-frothed mixture was placed in a Brookfield LVT Viscometer equipped with a jacketed small sample chamber and held at a temperature between 24.5°C. and 25.5°C. for 2,600 seconds. At the end of this time the sample had a viscosity of only 450 centipoises. In order to be usable in this invention the sample had to have a viscosity of not more than 10,000 centipoises after this length of time at the above-specified temperature in the jacketed chamber; thus, the sample more than amply satisfied this requirement.

The above-described mixture was then placed in a 5 quart Hobart N-50 mixer bowl. A Hobart mixer was fitted with a Hobart "D" wire whip and the mixture was beaten for ten minutes at a speed setting of two in the open atmosphere to whip air into the mixture. The resulting froth had a density of 10 pounds per cubic foot.

Then, we knifed the forth onto a substrate to a thickness of ¼ inch. The froth on the substrate was then heated for 5 minutes at 125°C. and polymerized into a tack-free, medium-celled, uniform foam having a density of 8 pounds per cubic foot. In order to be usable in this invention the froth had to polymerize to a tack-free condition in twenty minutes or less at 125°C., thus, the mixture and froth made from it more than amply passed this test.

When an Oakes mixer is employed, it is possible to prepare the polymerizable froth on a continuous basis. Thus, the mixture as described above is fed into the Oakes mixer, for example, through pipe 11 shown in FIGS. 1 and 2. Air or other inert gas under pressure is fed into the mixer, for example, through pipe 13. The resulting froth produced from the mixture and air in the Oakes mixer is then transported as by pipe 15 to the site of application, either a molding operation or a carpet backing operation. The froth effluent from the Oakes mixer can be used to continuously fill molds or can be continuously applied to the back of carpeting.

EXAMPLE 2

Three mixtures were prepared containing the amounts in weight parts of the ingredients listed in Table I below. All mixtures possessed a viscosity of less than 10,000 cps after holding at 24.5 to 25.5°C. for 2,600 seconds and none of the mixtures gelled when held at ambient (room) temperature for more than 1 hour at which time the test was discontinued.

The mixtures were mechanically beaten in a 5-quart Hobart N-50 mixer using a wire whip for 10 minutes. Each mixture produced a low density froth which cured to a tack-free, flexible foam having a density below 45 percent of the density of the mixture before frothing.

In a comparative test, the trimethylsiloxysilicate copolymer of mixture C was replaced with an equal weight amount of a surfactant copolymer having the average formula: $Me_3SiO[Me_2SiO]_{72}[MeO(C_3H_6O)_{29}(C_2H_4O)_{20}C_3H_6SiMeO]_{5.0}SiMe_3$. The resulting comparative mixture gelled in six minutes when held at ambient (room) temperature.

TABLE I

| Polyol I[1.] | A | B | C |
|---|---|---|---|
| | 100 | 100 | 100 |
| Dibutyltin dilaurate | 0.1 | 0.2 | 0.4 |
| $[(CH_3)_3SiO_{0.5}]_{0.5}[SiO_2]_{1.0}$[2.] | 6.0 | 6.0 | 6.0 |
| TDI[3.] | 26.0 | 26.0 | 26.0 |

1. Polyol I as used herein designates a glycerol started propylene oxide adduct triol having an average molecular weight of about 1,000 and a hydroxyl number of 168 and having the average formula:

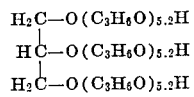

2. 50 wt. percent in xylene.
3. TDI as used herein designates a mixture of 80 weight per cent of 2,4-tolylene diisocyanate and 20 weight per cent of 2,6-tolylene diisocyanate.

EXAMPLE 3

Composition A of Example 2 was repeated except that the dibutyltin dilaurate was replaced with 0.02 weight parts of stannous octoate. The resulting mixture had a viscosity of about 900 after holding it at 24.5° to 25.5°C. for 2,600 seconds. A stable froth having a density of less than 45 percent of the liquid mixture was made from the mixture in the same manner as set forth in Example 2. When the froth was heated to 125°C. it cured to tack-free flexible foam in less than 10 minutes.

EXAMPLE 4

Nine mixtures were prepared from the following ingredients:

| | Wt. Pts. |
|---|---|
| Polyol II* | 100 |
| TDI | 105.8 |
| Surfactant (listed in Table II) | 10.0 |

*Polyol II as used herein designates a glycerol started propylene oxide adduct triol having an average molecular weight of about 259 and a hydroxyl number of about 650 and having the average formula:

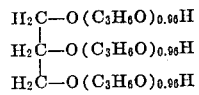

The viscosity of each resulting mixture was well below 10,000 cps after holding it at 24.5° to 25.5°C. for 2,600 seconds.

Each mixture A through I was mechanically beaten as set forth in Example 2 for 10 minutes to form a froth having a density as listed in Table II. Each froth was stable both structurally and chemically for at least 50 minutes and cured to a tack free, rigid foam having the density listed in Table II within less than 10 minutes at 125°C. or less. Mixtures H and I formed especially good, fine-celled foam.

Table II

| Mixture | | Surfactant No. and Formula | Froth Density | Foam Density |
|---|---|---|---|---|
| A. | 1. | $Me_3SiO[Me_2SiO]_{72}[MeO(C_3H_6O)_{29.1}(C_2H_4O)_{20.7}C_3H_6SiMeO]_{5.0}SiMe_3$ | 17.8 | 12.6 |
| B. | 2. | do. $(C_3H_6O)_{22.1}(C_2H_4O)_{29.5}$ do. | 20.5 | 14.0 |
| C. | 3. | do. $(C_3H_6O)_{17.1}(C_2H_4O)_{36.6}$ do. | 19.0 | 12.8 |
| D. | 4. | do. $(C_3H_6O)_{11.2}(C_2H_4O)_{44.3}$ do. | 19.2 | 12.5 |
| E. | 5. | $Me_3SiO[Me_2SiO]_{20}[BuO(C_3H_6O)_{14}(C_2H_4O)_{19}C_3H_6SiMe_{3.2}SiMe_3$ | 18.7 | 15.6 |
| F. | 6. | $Me_3SiO[Me_2SiO]_6[MeO(C_2H_4O)_7C_3H_6SiMeO]_7SiMe_3$ | 16.1 | 12.6 |
| G. | 7. | $Me_3SiO[Me_2SiO]_{13}[MeO(C_2H_4O)_{16}C_3H_6\ SiMeO]_{5.5}SiMe_3$ + methoxytriglycol in a 50:50 weight mixture | 19.7 | 14.9 |
| H. | 8. | $Me_3SiO[Me_2SiO]_{43}[MeO(C_3H_6O)_6(C_2H_4O)_{23}C_3H_6SiMeO]_{6.5}SiMe_3$ | 15.5 | 10.4 |
| I. | 9. | Partially cross-linked block copolymer* and butyl monoether of polyoxypropylene glycol having a viscosity of 65 Saybolt Universal Seconds at 100°F. in a 50:50 weight mixture | 12.9 | 9.1 |

*The siloxane block has the average formula: $Me_3SiO[Me_2SiO]_{13}[SiMeO]_{5.5}SiMe_3$; there are 1.1 moles per siloxane block of divalent polyoxyethylene blocks of the average formula: $-C_3H_6O(C_2H_4O)_7C_3H_6$- bonded to silicon and 4.4 mols per siloxane block of monovalent polyoxyethylene blocks of the average formula: $HO(C_2H_4O)_7C_3H_6$- bonded to silicon.

EXAMPLE 5

Eight mixtures were prepared from the following ingredients:

| | Wt. Pts. |
|---|---|
| Polyol I* | 100.0 |
| TDI | 28.0 |
| 1,1,2-Trichloro-1,2,2-trifluoroethane | 10.0 |
| Nickel acetylacetonate | 0.5 |
| Surfactant (listed in Table III) | 10.0 |

*Identified in Example 2.

This example illustrates the secondary expansion provided by a fluorocarbon boiling at about 48°C. The viscosity of each resulting mixture was well below 10,000 cps after holding it at 24.5° to 25.5°C. for 2,600 seconds.

Each mixture a through H was mechanically beaten as set forth in Example 2 for 10 minutes to form a froth having a density as listed in Table III. Each froth was stable both structurally and chemically for at least 50 minutes and cured to a tack-free, flexible foam having the density listed in Table III within less tha 10 minutes at 125°C. or less.

TABLE III

| Mixture | Surfactant No. | Froth Density | Foam Density |
|---|---|---|---|
| A. | 1* | 20.1 | 8.3 |
| B. | 2* | 16.1 | 8.8 |
| C. | 3* | 15.5 | 10.0 |
| D. | 4* | 15.8 | 8.1 |
| E. | 5* | 20.3 | 12.8 |
| F. | 10** | 21.4 | 16.7 |
| G. | 9* | 11.3 | 8.5 |
| H. | 11*** | 11.4 | 6.0 |

*Identified in Table II by number listed.
**Me₃SiO[ME₂SiO]₇[BuO(C₃H₆O)₁₂C₃H₆SiMeO]₃SiMe₃
***50 wt. % [(CH₃)₃SiO₀.₅]₀.₅[SiO₂]₁.₀ in Polyol I.

EXAMPLE 6

Five mixtures were prepared from the following ingredients:

|  | Wt. Pts. |
|---|---|
| Polyol III¹· | 100.0 |
| PAPI²· | 12.0 |
| Surfactant (listed in Table IV) | 10.0 |
| Nickel acetylacetonate | 0.5 |

1. Polyol III, as used herein, designates a mixture of diols and triols prepared by adding ethylene oxide and propylene oxide to a mixture of 4 mols glycerol and 1 mol dipropylene glycol, in a ratio providing an average of 14 wt. percent oxyethylene units and 86 wt. percent oxypropylene units based on the total oxyalkylene units. The hydroxyl number is 45.8 to 48.8 and the average molecular weight is about 3,700.

2. PAPI as used herein designates a polyisocyanate of the formula

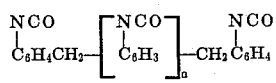

and has the following properties:

| Isocyanate equivalent (dibutylamine) | 133.5 |
|---|---|
| Viscosity (centipoises at 25°C.) | 250 |
| Hydrolyzable Chloride (%) | 0.35 |
| Specific Gravity (20/20°C.) | 1.2 |
| Flash Point (Cleveland Open Cup) | 425°F. |
| NCO content by weight | 31% minimum |
| Insoluble solids content | nil |

Each mixture A through E was mechanically beaten as set forth in Example 2 for 10 minutes to form a froth having a density as listed in Table IV. Each froth was stable both structurally and chemically for at least 60 minutes and each provided the drainage rate as listed in Table IV. Each froth was cured to a tack-free, flexible foam within less than 10 minutes at 125°C. or less.

TABLE IV

| Mixture | Surfactant No.* | Froth Density | Drainage — ml drained per 100 ml froth at: | |
|---|---|---|---|---|
|  |  |  | 30 min. | 60 min. |
| A | 3 | 26.2 | 0 | 2 |
| B | 4 | 38.1 | 0 | 10 |
| C | 5 | 18.9 | 0 | 1 |
| D | 6 | 22.7 | 0 | 10 |
| E | 8 | 27.1 | 0 | 9 |

*Identified in Table II by number listed.

EXAMPLE 7

A mixture was prepared from the following ingredients:

|  | wt. pts. |
|---|---|
| Polyol I | 100.0 |
| TDI | 26.0 |
| Nickel acetylacetonate | 0.5 |
| [(CH₃)₃SiO₀.₅[SiO₂]₁.₀* | 6.0 |

* 50 wt. % solution in xylene.

The viscosity of the mixture was about 450 cps after holding at 24.5° to 25.5°C. for 2,600 seconds.

The mixture was frothed in the manner described in Example 2 by beating for 10 minutes at a speed setting of 2. The resulting froth had a density of about 10 pounds per cubic foot and was coated onto a substrate to a one-quarter inch thickness. The coated substrate was cured for 5 minutes at 125°C. to provide a tack-free, medium-celled, uniform foam having a density of about 8 pounds/cu.ft.

EXAMPLE 8

This example illustrates a range of foam densities and rates of froth drainage obtainable by the practice of this invention.

Eleven mixtures were prepared from the following ingredients:

|  | Wt. Pts. |
|---|---|
| Polyol IV¹· | 95.0 |
| Polyol V²· | 5.0 |
| Prepolymer³· | 20.6 |
| Surfactant (as listed in Table V) | 10.0 |
| Nickel acetylacetonate | 0.5 |

1. Polyol IV is a glycerol-started, ethylene oxide-propylene oxide adduct triol having an average molecular weight of about 3,525 and an average hydroxyl number of about 48 and having the average formula:

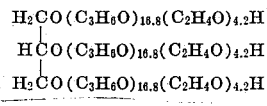

2. Polyol V is a blend having an average hydroxyl number of about 785 and contains about 13.5 parts of ethylene glycol and about 86.5 parts of a glycerol-started ethylene oxide adduct triol having an average molecular weight of about 269 and the average formula:

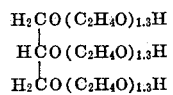

3. Prepolymer is prepared by reacting 84 weight parts of TDI as identified in Example 2 and 16 weight parts of Polyol II to the extent that 32.5 wt. percent of the prepolymer are free NCO groups. The viscosity of each resulting mixture was well below 10,000 cps after holding it at 24.5° to 25.5°C. for 2,600 seconds.

Each mixture A through J was mechanically beaten as set forth in Example 2 for 10 minutes to form a froth having a density as listed in Table V. Each froth was stable both structurally and chemically for at least 50 minutes and cured to a tack-free, semi-flexible foam having the density listed in Table V within less than 10 minutes at 125°C. or less.

Table V

| Mixture | Surfactant No. | Froth Density | Foam Density | Drainage—ml drained per 100 ml froth | |
|---|---|---|---|---|---|
| | | | | 30 min. | 60 min. |
| A. | 1 | 32.2 | 24.1 | 0 | 1 |
| B. | 2 | 18.9 | 17.5 | 0 | 0 |
| C. | 3 | 25.8 | 21.3 | 0 | 0 |
| D. | 4 | 34.5 | 28.4 | 0 | 0.5 |
| E. | 5 | 18.1 | 17.4 | 0 | 0 |
| F. | 6 | 17.2 | 14.5 | 0 | 0 |
| G. | 7 | 18.2 | 16.7 | 0 | 2 |
| H. | 8 | 18.3 | 16.9 | 0 | 0 |
| I. | 9 | 15.1 | 14.5 | 0 | 0 |
| J. | 11 | 29.7 | 20.0 | 0 | 1 |

See Table II for identification of Surfactant Nos. 1 through 9. See Table III for identification of Surfactant No. 11.

The partially crosslinked block copolymers useful as surfactants in this invention (e.g., surfactant No. 9 in Table II above) can be produced by the addition of a mixture of suitable polyoxyalkylene polymers to a hydrogensiloxane. A suitable mixture of polyoxyalkylene polymers is composed of a linear polyoxyalkylene polymer endblocked with a hydroxy group and a alkenyloxy group and a linear polyoxyalkylene endblocked with two alkenyloxy groups. The addition reaction is conducted in the presence of a chloroplatinic acid-catalyst and a basic compound (e.g., sodium carbonate or sodium bicarbonate). A suitable process is disclosed in U.S. Pat. application Ser. No. 790,830, now abandoned.

Various modifications and variations of this invention will be obvious to a worker skilled in the art and it is to be understood that such modifications and variations are to be included within the purview of this application and the spirit and scope of the appended claims.

We claim:

1. A process for providing a backing on a carpeting material which comprises:
   I. forming a substantially non-aqueous mixture comprising
      a. an organic polyisocyanate,
      b. a polyhydroxyl-containing compound substantially reactive with said polyisocyanate only at a temperature of at least 70°C. to form a polyurethane,
      c. an organosilicon surfactant for structurally stabilizing the froth produced according to step (II) below, during the period that the liquid phase of said froth is chemically stable and until said froth is cured by heating to a temperature of at least 70°C. to produce a cured foam, and
      d. a catalyst having substantial catalytic activity in the curing of said mixture only at temperatures of at least 70°C.;
   II. substantially uniformly dispersing inert gas throughout the mixture by mechanical beating of said mixture to form a heat curable froth which is substantially structurally and chemically stable, but workable at ambient conditions, wherein
      i. said froth is free of auxiliary blowing agents;
      ii. components (a), (b), (c) and (d) above, present in the liquid phase of said froth are such that an unfrothed admixture containing only (a), (b), (c) and (d) in the same proportions (a), (b), (c) and (d) are present in the liquid phase of said froth is chemically stable to the extent that the admixture retains a viscosity of not greater than 10,000 cps fro about 2,600 seconds at 25°C. ± 0.5°C.;
      iii. said froth has a density of not greater than 45 percent of the density of the unfrothed liquid phase; and
      iv. a ¼ inch section of said froth is curable to a tack free conditions in not more than about 30 minutes at a temperature of 125°C.; and
   III. applying said froth to the back of a carpeting material;
   IV. shaping said froth into a desired shape; steps (III) and (IV) being carried out without initiating any substantial polymerization; and
   V. heat curing the resultant shaped froth at a temperature of at least 70°C. to form a cured polyurethane foam backing on said carpeting material, any further expansion of said froth during heat curing being substantially only thermal expansion of said inert gas employed.

2. A process as defined in claim 1, wherein said froth is shaped on the back of the carpeting by knife coating the froth to a uniform gage.

3. A process as defined in claim 1 wherein the resulting shaped froth is conveyed to a different location from that where step (IV) is performed and step (V) is carried out at said different location.

4. A process as defined in claim 1, wherein said carpeting material has a front side faced with fibers.

5. A process as defined in claim 1 wherein the carpeting to which the froth is applied is composed of a first backing having a front side faced with fibers which pass through the first backing and which extend beyond the back side of said first backing and wherein the froth is applied to (a) the back side of the first backing and (b) to the portion of the fibers extending beyond said back side, shaped and cured to (a) form a cured polyurethane foam on the back side of the first backing and (b) bond the fibers to the first backing.

6. A process as defined in claim 1, wherein said inert gas is air.

7. A process as defined in claim 1, wherein said catalyst is nickel acetylacetonate.

8. A process as defined in claim 1, wherein said inert gas is introduced into the mixture under pressure and the mechanical beating is conducted at a pressure not greater than 100 psig.

9. A process as defined in claim 1, wherein said inert gas is drawn into the mixture from the overlying atmosphere and the mechanical beating is conducted at about atmospheric pressure.

10. A process as defined in claim 1, wherein said mixture also contains a filler.

11. A process as defined in claim 1, wherein said organosilicon surfactant is selected from the group consisting of (a) an organosilicon surfactant consisting essentially of $SiO_2$ units and $(CH_3)_3SiO_{0.5}$ units in a mol ratio of about 0.8:1 to 2.0:1, respectively, (b) a partially crosslinked siloxanepolyoxyalkylene block copolymer composition wherein the blocks are linked by silicon to carbon linkages or silicon to oxygen to carbon linkages, the siloxane blocks are comprised of hydrocarbonsiloxane groups and have an average of at least two valences of silicon per block combined in said linkages, at least a portion of the polyoxyalkylene blocks are comprised of oxyalkylene groups, having at least two valences of carbon or carbon-bonded oxygen per block combined in said linkages, any remaining polyoxyalkylene blocks are comprised of oxyalkylene groups having only one valence of carbon or carbon-bonded oxygen per block combined in said linkages, and (c) a siloxane-polyoxyalkylene block copolymer.

12. A process as defined in claim 1, wherein said organosilicon surfactant is a siloxane-polyoxyalkylene block copolymer.

13. A process as defined in claim 1, wherein said froth has a density of not greater than 35 percent of the density of the unfrothed liquid phase.

14. A process as defined in claim 1, wherein the polyisocyanate is an aromatic polyisocyanate or mixtures thereof; and wherein said polyhydroxyl compound is selected from the group consisting of a polyether polyol, a polymer/polyol of an ethylenically unsaturated monomer and and a polyether polyol, a cyclic ester polymer, and mixtures thereof.

15. A process as defined in claim 1, wherein said inert gas is air, nitrogen or carbon dioxide; wherein said catalyst is nickel acetylacetonate; wherein the inert gas is present in the mixture as a result of having been introduced under pressure and the mechanical beating is conducted at a pressure not greater than 100 psig.; wherein a filler is also present in the mixture; and wherein said froth has a density of not greater than 35 percent of the density of the unfrothed liquid phase.

16. A process as defined in claim 15, wherein said carpeting material has a front side faced with fibers.

17. A process as defined in claim 15, wherein said inert gas is air.

18. A process as defined in claim 17, wherein the polyisocyanate is an aromatic polyisocyanate or mixtures thereof; and wherein said polyhydroxyl compound is selected from the group consisting of a polyether polyol, a polymer/polyol of an ethylenically unsaturated monomer and a polyether polyol, a cyclic ester polymer, and mixtures thereof.

19. A process as defined in claim 18, wherein said aromatic polyisocyanate is selected from the group consisting of tolylene diisocyanate, bis(4-isocyanatophenyl) methane, polyphenylmethylene polyisocyanate, a prepolymer of tolylene diisocyanate and any one of the polyhydroxyl containing compounds as herein defined above, and mixtures thereof.

20. A process as defined in claim 19, wherein said organosilicon surfactant is a siloxane-oxyalkylene block copolymer.

21. A process as defined in claim 20, wherein said polyisocyanate consists essentially of tolylene diisocyanate and said polyhydroxyl compound consists essentially of a polyether polyol having a hydroxyl number in the range of about 28 to about 1,000.

22. A process as defined in claim 20, wherein said polyisocyanate consists essentially of bis(4-isocyanatophenyl)methane and said polyhydroxyl compound consists essentially of a polyol mixture of a polyether polyol, a polymer/polyol of an ethylenically unsaturated monomer and a polyether polyol, and a cyclic ester polymer.

23. The resultant cured polyurethane foam backed carpeting material product produced according to the process of claim 1.

24. The resultant cured polyurethane foam backed carpeting material product produced according to the process of claim 15.

* * * * *

UNITED STATES PATENT OFFICE
CERTIFICATE OF CORRECTION

Patent No. 3,849,156    Dated November 19, 1974

Inventor(s) L. Marlin and E. G. Schwarz

It is certified that error appears in the above-identified patent and that said Letters Patent are hereby corrected as shown below:

Column 1, line 44, "fact" should be --fast--.

Column 2, line 33, "difficult" should be --- different---.

Column 6, line 65, "bown" should be ---bowl---.

Column 10, line 60, "or", first occurrence, should be ---of---.

Column 14, line 36, "coponding" should be ---copending---.

Column 16, line 3, "iosmers" should be ---isomers---.

Column 18, line 34, "forth" should be ---froth---.

Column 20, line 15, that portion of the formula shown as "$H_2\overset{|}{C}-$" should be ---$H\overset{|}{\underset{|}{C}}-$---.

Columns 19-20, in TABLE II the right hand portion of the formula for Surfactant No. 5 shown as "$Me_{3.2}SiMe_3$" should be ---"$MeO]_{3.2} SiMe_3$"---.

Column 20, line 65, "a" should be ---A---.

UNITED STATES PATENT OFFICE
CERTIFICATE OF CORRECTION

Patent No. 3,849,156  Dated November 19, 1974

Inventor(s) L. Marlin and E. G. Schwarz     Page 2

It is certified that error appears in the above-identified patent and that said Letters Patent are hereby corrected as shown below:

Column 21, line 2, "tha" should be ---than---.

Column 24, line 14 "fro" should be ---for---.

Column 25, line 29, "and", second occurrence, should be deleted.

Signed and sealed this 1st day of July 1975.

(SEAL)
Attest:
RUTH C. MASON
Attesting Officer

C. MARSHALL DANN
Commissioner of Patents
and Trademarks